United States Patent
Peng et al.

(10) Patent No.: US 9,296,113 B2
(45) Date of Patent: Mar. 29, 2016

(54) DELTA ROBOT AND LINEAR DELTA MECHANISM

(71) Applicant: DELTA ELECTRONICS, INC., Taoyuan Hsien (TW)

(72) Inventors: Chih-Cheng Peng, Hsinchu (TW); Tsao-Hsiang Wang, Taichung (TW); Hsin-Hsien Wu, Changhua County (TW); Ming-Chi Yang, Taichung (TW)

(73) Assignee: DELTA ELECTRONICS, INC. (TW)

( * ) Notice: Subject to any disclaimer, the term of this patent is extended or adjusted under 35 U.S.C. 154(b) by 21 days.

(21) Appl. No.: 14/046,247

(22) Filed: Oct. 4, 2013

(65) Prior Publication Data

US 2014/0338489 A1 Nov. 20, 2014

(30) Foreign Application Priority Data

May 15, 2013 (TW) .............................. 102117139 A

(51) Int. Cl.
*B25J 9/00* (2006.01)
*B25J 17/02* (2006.01)

(52) U.S. Cl.
CPC ............ *B25J 17/0266* (2013.01); *B25J 9/0051* (2013.01); *Y10T 74/20317* (2015.01)

(58) Field of Classification Search
CPC ........ B25J 9/0015; B25J 9/003; B25J 9/0045; B25J 9/0051; B25J 17/0258; B25J 18/02
USPC .................. 74/490.01, 490.05; 414/680, 735, 414/744.5; 901/18
See application file for complete search history.

(56) References Cited

U.S. PATENT DOCUMENTS

| | | | | |
|---|---|---|---|---|
| 6,543,987 | B2 * | 4/2003 | Ehrat | 414/735 |
| 7,331,253 | B2 * | 2/2008 | Burkert et al. | 74/490.01 |
| 7,395,136 | B2 * | 7/2008 | Osten | 700/258 |
| 8,091,448 | B2 * | 1/2012 | Kim et al. | 74/490.05 |
| 8,113,083 | B2 | 2/2012 | Breu | |
| 8,272,290 | B2 | 9/2012 | Zhang et al. | |
| 8,307,732 | B2 | 11/2012 | Kinoshita et al. | |
| 8,886,331 | B2 * | 11/2014 | Labadie et al. | 607/57 |
| 2004/0086351 | A1 * | 5/2004 | Kim et al. | 409/235 |
| 2010/0107835 | A1 * | 5/2010 | Lindee | 83/23 |
| 2010/0122602 | A1 * | 5/2010 | Marcroft et al. | 74/490.03 |
| 2011/0033275 | A1 | 2/2011 | Lehmann | |
| 2011/0100145 | A1 * | 5/2011 | Feng | 74/490.01 |
| 2011/0291433 | A1 * | 12/2011 | Feng | 294/65 |
| 2012/0171383 | A1 * | 7/2012 | Christensen et al. | 427/427.3 |

FOREIGN PATENT DOCUMENTS

| | | |
|---|---|---|
| CN | 102107431 | 6/2011 |
| CN | 102152300 | 8/2011 |

(Continued)

*Primary Examiner* — William Kelleher
*Assistant Examiner* — Bobby Rushing, Jr.
(74) *Attorney, Agent, or Firm* — Hauptman Ham, LLP

(57) ABSTRACT

A linear delta mechanism includes a base platform, a movable platform, and a plurality of guide sets. The base platform includes a base structure and a base stand. The base stand is disposed at a center location of the base structure. The movable platform is movable with respect to the base platform. The plurality of guide sets are connected to the base platform and configured to drive the movable platform. Each of the guide sets includes a linear actuator and an actuating rod. The linear actuators of the guide sets are symmetrically disposed around the base stand. Each of the actuating rods has a first end and a second end. The first end is driven by the linear actuator, and the second end is connected to the movable platform.

12 Claims, 7 Drawing Sheets

(56) References Cited

FOREIGN PATENT DOCUMENTS

| | | |
|---|---|---|
| CN | 102501249 | 6/2012 |
| CN | 102632502 | 8/2012 |
| CN | 102848382 | 1/2013 |
| CN | 102848383 | 1/2013 |
| CN | 102975203 | 3/2013 |
| DE | 102008062958 A1 * | 7/2010 ............... B25J 17/02 |

* cited by examiner

DELTA ROBOT AND LINEAR DELTA MECHANISM

RELATED APPLICATIONS

This application claims priority to Taiwan Application Serial Number 102117139, filed May 15, 2013, which is herein incorporated by reference.

BACKGROUND

1. Field of Disclosure

The present disclosure relates to a linear delta mechanism. More particularly, the present disclosure relates to a stable linear delta mechanism and a delta robot with the foregoing delta mechanism.

2. Description of Related Art

A conventional serial-linked robot mechanism requires a serial-linked three-axis adjusting mechanism. This adjusting mechanism can automatically adjust the horizontal and vertical posture and angle of a movable platform in the adjusting mechanism. This adjusting mechanism, however, has drawbacks as follows:

(1) The serial-linked mechanism is apt to cause error accumulation;

(2) The serial-linked mechanism having a long load flow line, which makes the mechanical strength weaker and easily deformed;

(3) The inertia has to be increased in improving the strength of a serial-linked mechanism, which results in more difficult mechanism control, lower accuracy and worse energy loss; and (4) The serial-linked mechanism is not able to effectively eliminate the thermal deformation in operation.

To address the foregoing problems, the serial-linked mechanism in the industry is replaced with a parallel-linked mechanism, such as a delta mechanism. The delta mechanism is a closed-loop system. Robots adopting the conventional delta mechanism dispose three fixing stands surrounding a working platform, and extend three guide sets from the three fixing stands. One end of each of the guide sets consists of a linear actuator, the other end of each of the guide sets consists of a linkage rod set connected to a movable platform. These linear actuators respectively move forth and back along single direction, to drive the movable platform moving in a three-dimensional space. This type of conventional parallel-linked mechanism can resolve issues such as complicated structure, large inertia, and large load.

The conventional parallel-linked mechanism mentioned above can resolve part of the problems of serial-linked mechanism, but has drawbacks listed as below:

First, three actuating sets surrounding a working platform are disposed around the parallel-linked mechanism. As a result, the space above and around the working platform cannot be used efficiently. The space below the working platform for transmitting work piece is also greatly limited, because of the three actuating sets and their fixing structures taking part of the space.

Second, since the space below the working platform is used during working process, the working height of the working platform cannot be lowered.

Third, the three actuating sets and their fixing structures are disposed surrounding the working platform. The total space taken can be huge and inconvenient for installing and transporting.

Fourth, the three actuating sets scattering surrounding the working platform spread the working inertia and is not easy to be controlled. Therefore, it is more difficult to tune the stability of the conventional linear parallel-linked robot.

SUMMARY

According to one aspect of the present disclosure, a linear delta mechanism includes a base platform, a movable platform, and a plurality of guide sets. The base platform includes a base structure and a base stand. The base stand is disposed at a center location of the base structure. The movable platform is movable with respect to the base platform. The plurality of guide sets are connected to the base platform. The guide sets are configured to drive the movable platform. Each of the plurality of guide sets includes a linear actuator and an actuating rod. The linear actuators of the guide sets are symmetrically disposed around the base stand. Each of the actuating rods has a first end and a second end. The first end is driven by the linear actuator, and the second end is connected to the movable platform.

In the foregoing description, the linear delta mechanism can further include a cover disposed over the base structure.

According to another aspect of the present disclosure, a delta robot with delta mechanism includes a base platform, a movable platform, a rotating device, and a plurality of guide sets. The base platform includes a base structure and a base stand. The base stand is disposed at a center location of the base structure. The movable platform is movable with respect to the base platform, and the movable platform is configured to drive a carrier. The rotating device is connected to the movable platform, and the rotating device is configured to rotate the carrier. The plurality of guide sets are connected between the base platform and the movable platform. Each of the plurality of guide sets includes a driving source, an actuator, and a plurality of actuating rods. The driving source is connected to the base stand. The actuators of the guide sets are symmetrically disposed around the base stand. Each of the plurality of actuating rods further includes an upper actuating rod and a lower actuating rod. The upper actuating rod has a first end at the upper side of the upper actuating rod, and the first end is connected to and drove by the actuator. The lower actuating rod is pivotally connected to the upper actuating rod, and the lower actuating rod has a second end at the lower side of the lower actuating rod. The second end is pivotally connected to and drives the movable platform.

In the foregoing description, the motion of the actuator can be linear or non-linear. Moreover, a shifting area of the upper actuating rod driven by the actuator can be above the base structure. And each of the lower actuating rods can be connected to the movable platform and the upper actuating rod through a ball joint or a universal joint. Each of the upper actuating rods can be in bended shape.

According to yet another aspect of the present disclosure, a delta robot with delta mechanism includes a base platform, a movable platform, a rotating device, and a plurality of guide sets. The base platform includes a base structure and a base stand. The base stand is disposed at a center location of the base structure. The movable platform is movable with respect to the base platform, and the movable platform is configured to drive a carrier. The rotating device is connected to the base platform. The rotating device extends from the base platform and is for rotating the carrier through the movable platform. The guide sets are connected between the base platform and the movable platform. Each of the guide sets includes an actuator and an actuating rod. The actuators are symmetrically disposed around the base stand. The actuating rod includes an upper actuating rod and a lower actuating rod. The upper actuating rod has a first end connected to and drove by the actuator. The lower actuating rod is pivotally connected to the upper actuating rod. The lower actuating rod has a second end connected to and drives the movable platform.

In the foregoing description, each of the upper actuating rods can be in bended shape. Each of the lower actuating rods can be connected to the movable platform and the upper actuating rod through a ball joint or a universal joint.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
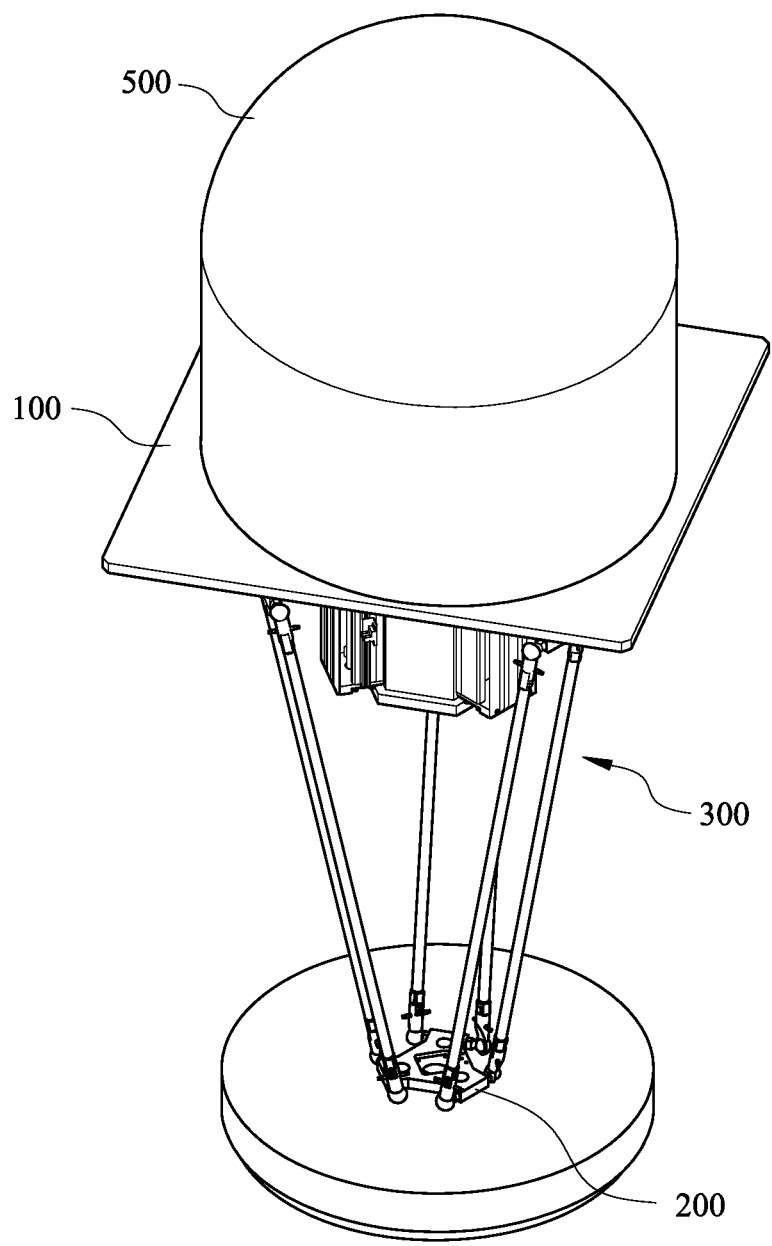
FIG. 1 is a perspective view of a linear delta mechanism with a cover according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a perspective view of a linear delta mechanism with a cover 500 according to one embodiment of the present disclosure. The linear delta mechanism includes a base platform 100, a movable platform 200, and a plurality of guide sets 300. Stretching out and in of the parallel-linked symmetrically-disposed guide sets 300 can drive the movable platform 200 moving relative to the base platform 100 in three-dimensional space. Additionally, from FIG. 1, the linear delta mechanism can includes a cover 500, for shielding the environmental influence during the operation of the linear delta mechanism.

Figure 2:
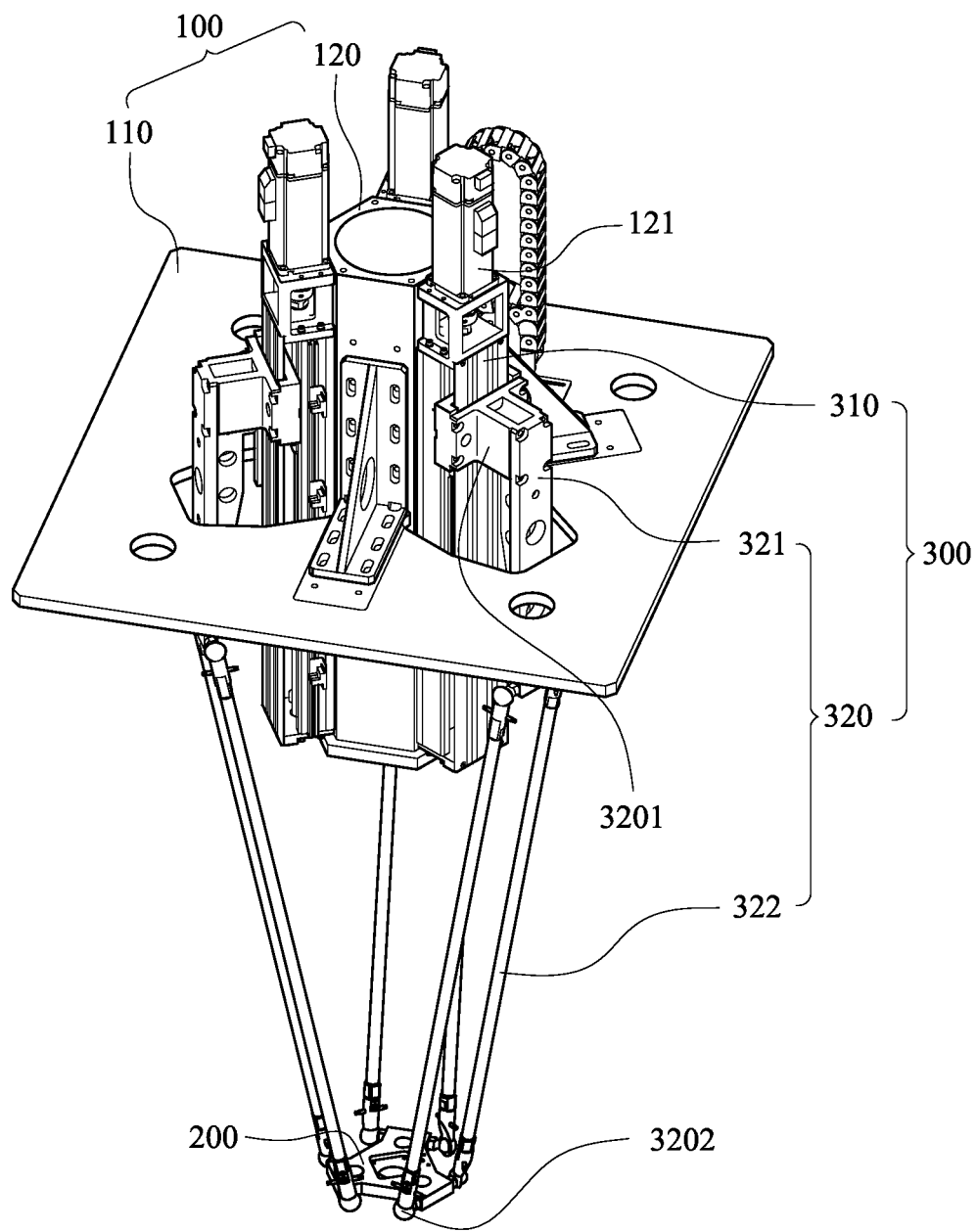
FIG. 2 is a perspective view of the linear delta mechanism according to the embodiment of FIG. 1.

FIG. 2 is a perspective view of the linear delta mechanism according to the embodiment of FIG. 1. The base platform 100 includes a base structure 110 and a base stand 120. The base stand 120 is disposed at a center location of the base structure 110. The movable platform 200 is movable with respect to the base platform 100.

Figure 2A:
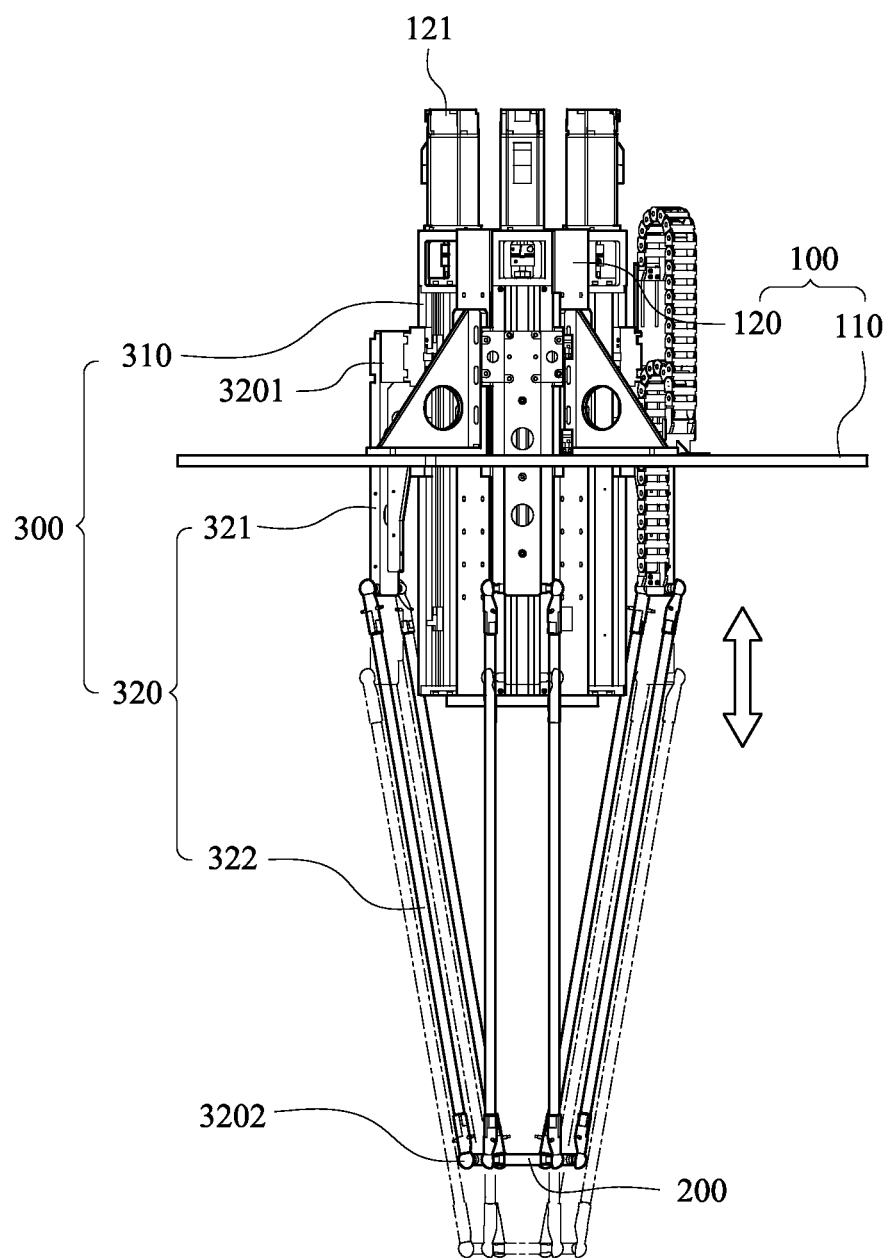
FIG. 2A is a side elevational view of the linear delta mechanism according to the embodiment of FIG. 2.

FIG. 2A is a side elevational view of the linear delta mechanism according to the embodiment of FIG. 2. The plurality of guide sets 300 are connected between the base platform 100 and the movable platform 200. Each of the guide sets 300 includes a linear actuator 310 and an actuating rod 320. The linear actuators 310 are symmetrically and equally disposed around the base stand 120. The linear actuators 310 drive the actuating rods 320, and the actuating rods 320 are for driving the movable platform 200. Each of the actuating rods 320 includes an upper actuating rod 321 and a lower actuating rod 322 pivotally connected together. The upper actuating rod 321 at the upper side thereof has a first end 3201 of the actuating rod 320. The first end 3201 is connected to the linear actuator 310 and is driven by the linear actuator 310. The lower actuating rod 322 at the lower side thereof has a second end 3202 of the actuating rod 320. The second end 320 is for driving the movable platform 200. The first end 3201 is locked and connected to each of the linear actuator 310. The upper actuating rod 321 is connected to the lower actuating rod 322 through a ball joint or a universal joint. The second end 3202 is connected to the movable platform 200 through another ball joint or a universal joint (not numbered). As a result, the movable platform 200 can drive a carrier 600 with motion in multiple degrees of freedom.

It is worth noting that the linear delta mechanism of this embodiment can include a plurality of motors 121, as the driving source. Each motor 121 can drive each linear actuator 310, so that the linear actuator 310 can drive the actuating rod 320 stretching out and in stably at a overall center of mass. Moreover, the movable platform 200 can be driven stably.

In FIG. 2, each upper actuating rod 321 is a straight rod. Each upper actuating rod 321 is driven by each linear actuator 310. Adjusting the feeding amount of each linear actuator 310 can adjust the shifting amount of each actuating rod 320, thus adjust the location of the movable platform 200 in the three-dimensional space.

Figure 3:
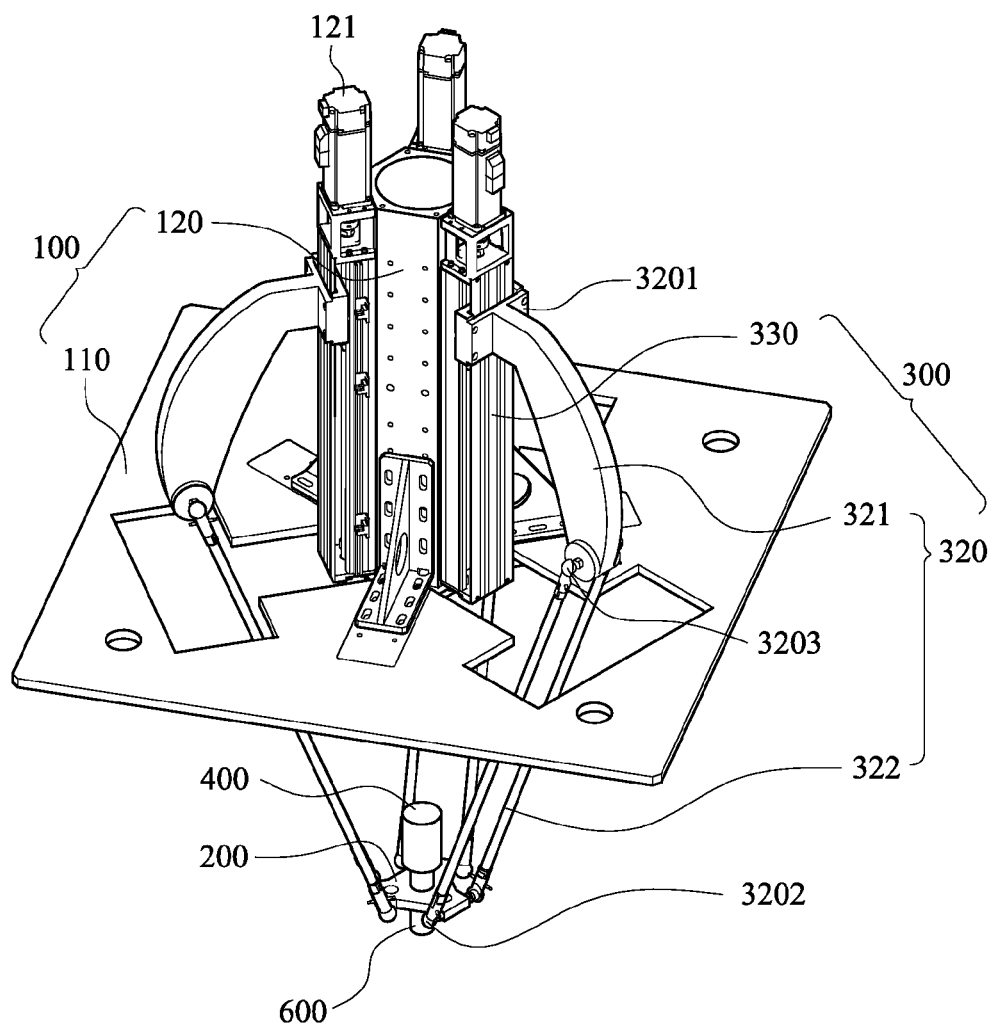
FIG. 3 is a perspective view of a delta robot according to another embodiment of the present disclosure.

FIG. 3 is a perspective view of a delta robot according to another embodiment of the present disclosure. The delta robot includes a base platform 100, a movable platform 200, a plurality of guide sets 300 and a rotating device 400.

The base platform 100 includes a base structure 110 and a base stand 120. The base stand 120 is disposed at a center location of the base structure 110. The plurality of guide sets 300 are for connecting between the base platform 100 and the movable platform 200 and for driving the movable platform 200 moving in three-dimensional space. The rotating device 400 is connected to the movable platform 200. The rotating device 400 rotates a carrier 600 on the movable platform 200, and the carrier 600 can drive a workpiece.

Figure 3A:
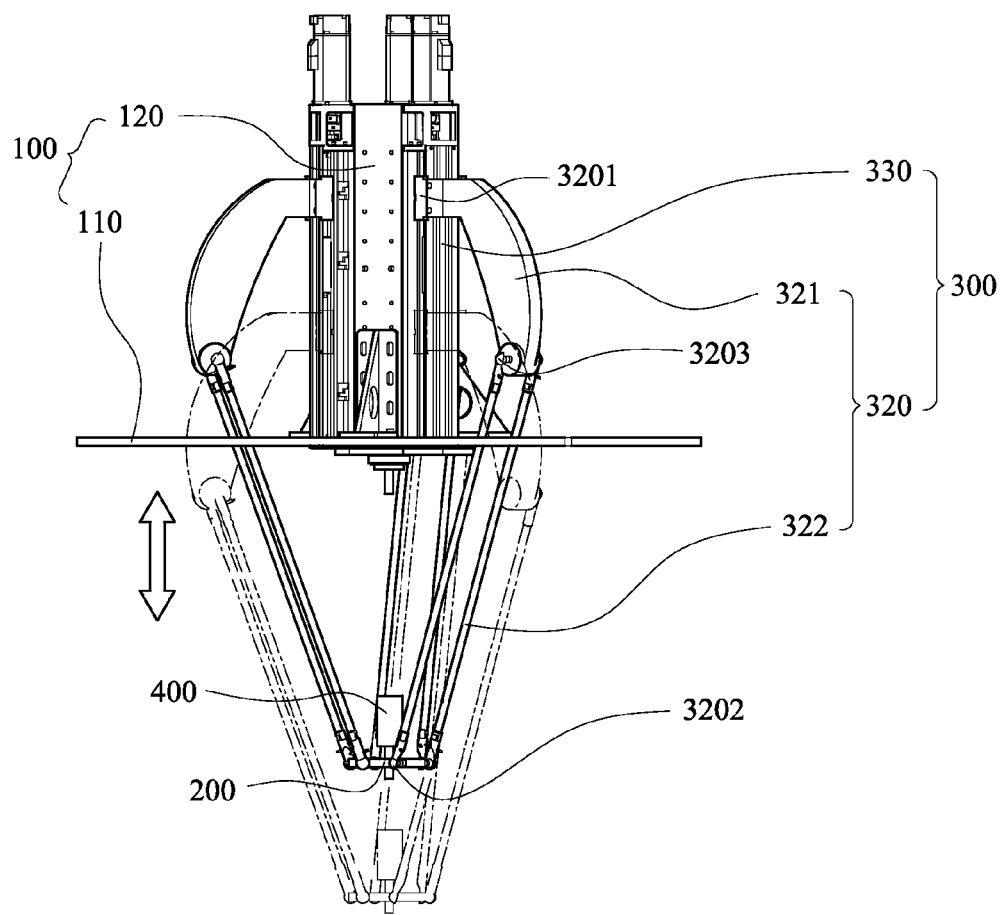
FIG. 3A is a side elevational view of the delta robot according to the embodiment of FIG. 3.

FIG. 3A is a side elevational view of the delta robot according to the embodiment of FIG. 3. The guide sets 300 are connected between the base platform 100 and the movable platform 200. The guide set 300 includes an actuator 330 and an actuating rod 320. The actuators 330 are symmetrically and equally disposed around the base stand 120. Each actuating rod 320 is driven by each actuator 330, and thus movable platform 200 can move in three-dimensional space. Each actuating rod 320 includes an upper actuating rod 321 and a lower actuating rod 322. The upper actuating rod 321 at the upper side thereof has a first end 3201 of the actuating rod 320. The first end 3201 is connected to the actuator 330. Also, the lower actuating rod 322 has a pivot end 3203 (a ball joint or a universal joint) connected to the upper actuating rod 321. The lower actuating rod 322 has a second end 3202 of the actuating rod 320, while the second end 3202 is connected to the movable platform 200. When the actuator 330 drives the upper actuating rod 321 stretching out and in, the lower actuating rod 322 moves with the upper actuating rod 321 too, and drives the movable platform 200 to change posture, position, and angle. At this time, the space for ascending and descending for each actuating rod 320 can take space around the base structure 110. In other words, each actuator 330 can drive each upper actuating rod 321 moving up and down along each side of the base stand 120, so that the movable platform 200 can move in the three-dimensional space. Furthermore, by disposing the actuators 330 symmetrically and equally around the base stand 120, and by disposing the base stand 120 at the center location of the base structure 110, the stability during the delta robot operating can be further improved.

From the embodiment of FIG. 3, the actuator 330 of the delta robot is actuating linearly, driving the upper actuating rod 321 stretching in and out. And at the same time, the upper actuating rod 321 drives the lower actuating rod 322, and the plurality of guide sets 320 operates independently and drives the movable platform 200 to change posture, position, and angle. Moreover, the actuator 330 not only can be operating linearly (as shown) but also non-linearly. As a result, the actuator 330 can drive the upper actuating rod 321 by swinging, thus the movable platform 200 can motion in more versatile pattern.

According to this embodiment, the base stand 120 is disposed at a center location of the base structure 110, so that each guide set can stably drive the movable platform 200 moving in horizontal, inclined, and vertical direction. Moreover, the plurality of actuators 300 are symmetrically and equally disposed around the base stand 120. Therefore, the delta robot according to this embodiment is more stable. And each side of the space above the base structure 110 (the operating mechanism above the base structure 110 are located at the center) can be used efficiently. As a result, the operating space for the actuating rod 320 can be increased, or the installing height of the base platform 100 can be lowered, as design needed. So the working space can be increased according to present disclosure. On the other hand, this centering design of the base platform 100 can make easier of the packaging and transporting after producing, also the installing and maintaining at once. The installing and transporting are both convenient and space saving.

Figure 4:
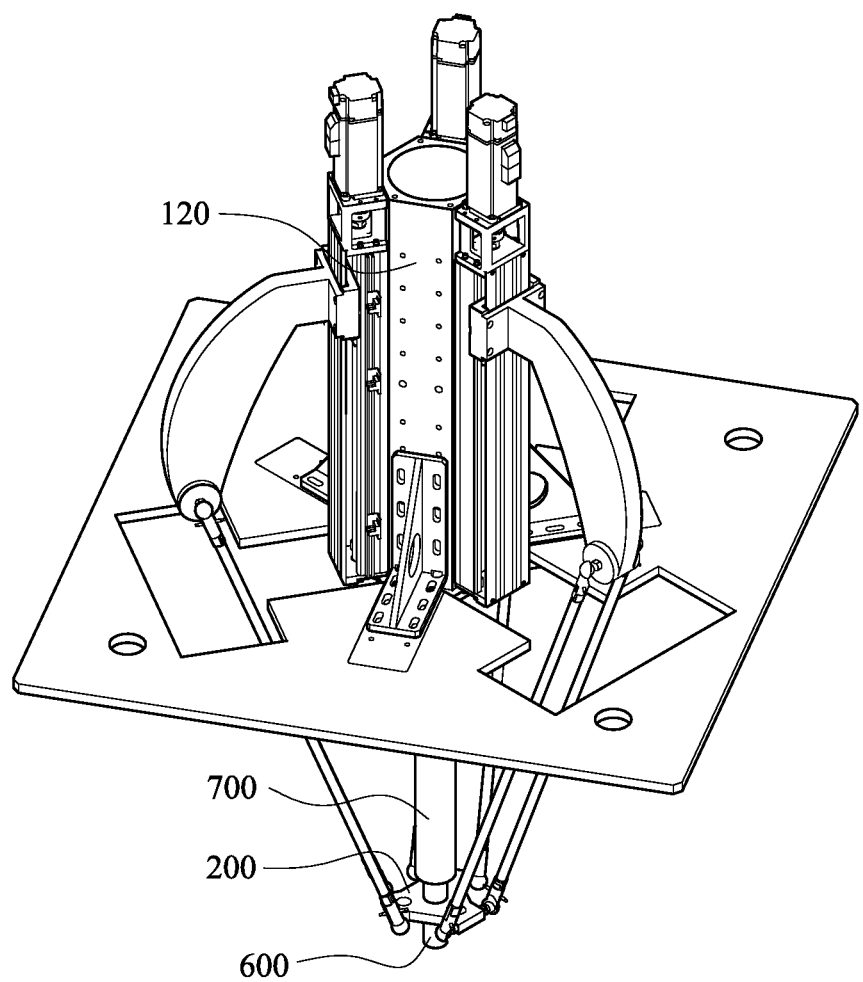
FIG. 4 is a perspective view of a delta robot according to another embodiment of the present disclosure.
Figure 4A:
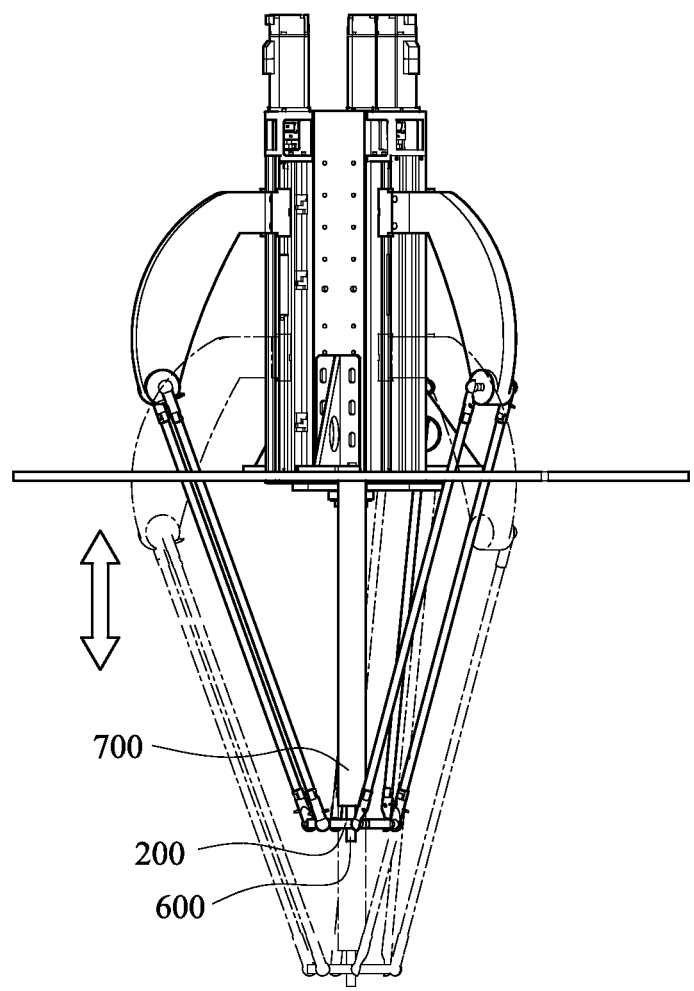
FIG. 4A is a side elevational view of the delta robot according to the embodiment of FIG. 4.

FIG. 4 is a perspective view of a delta robot according to another embodiment of the present disclosure. FIG. 4A is a side elevational view of the delta robot according to the embodiment of FIG. 4. The delta robot of this embodiment has a delta mechanism. The delta robot is for allocating at an automatic production line. The major feature about this embodiment is that the delta mechanism of the delta robot improves the driving mechanism of the rotating device 700. The rotating device 700 can be a linkage directly connected between the base stand 120 and the movable platform 200. The rotating device 700 can be drove by a motor (not shown here) disposed in the base stand 120. Therefore, the rotating device 700 extends from the base stand 120, and the rotating device 700 can rotate and work through the movable platform 200. The rotating device 700 through the base stand 120 can stably drive the carrier 600 of the movable platform 200 rotating.

According to the foregoing embodiments and examples, the advantages of the present disclosure are described as follows.

1. By the design of grouping together the base platform, the movable platform and the guide sets, the stability is increased, the working area is enlarged, the cumulated error is reduced, and the motion accuracy is increased.

2. Using the base stand to put together the guide sets and other components makes the delta mechanism and the delta robot easy to install and space-efficient. A cover can further be included to avoid damaging or interference caused by the external environment.

3. Increasing working space of the actuating rod can provide larger working area. Moreover, working space can be free from interference caused by elements surrounded, which prior art suffered from.

4. The upper actuating rods can be in bended shape, so that the working area and working angle can be both enlarged. The interference between elements of the guide set can be reduced.

5. The installing height of the base platform can be lowered as design needed. Therefore, the delta robot or the delta mechanism can be installed low at the manufacturing line, thus provide lower working height for special space needing.

6. Disposing the rotating device in the base stand instead of at the base stand to reduce the carrying load of the base stand. The carrying load capacity of the delta robot can be increased as a result.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A linear delta mechanism, comprising:
    a base platform, comprising:
        a base structure; having a hole at a center location of the base structure; and
        a base stand received in the hole, wherein the base stand has an elongated shape extending from beyond a bottom side of the base structure to beyond a top side of the base structure;
    a movable platform movable with respect to the base platform; and
    a plurality of guide sets connected to the base platform, and configured to drive the movable platform, each of the guide sets comprising:
        a linear actuator, wherein the linear actuators of the guide sets are symmetrically fastened on the base stand and are received in the hole; and
        an actuating rod having a first end and a second end to the movable platform, wherein when the first end is driven by the linear actuator, and the second end is connected to the movable platform.

2. The linear delta mechanism of claim 1, further comprising a cover, wherein the cover is disposed over the base structure.

3. A delta robot with a delta mechanism, the delta robot comprising:
    a base platform, comprising:
        a base structure; and
        a base stand disposed at a center location of the base structure, wherein the base stand has an elongated shape extending from beyond a bottom side of the base structure to beyond a top side of the base structure;
    a movable platform movable with respect to the base platform and configured to drive a carrier;
    a rotating device connected to the movable platform and configured to rotate the carrier; and
    a plurality of guide sets connected between the base platform and the movable platform, each guide sets comprising:
        a driving source connected to the base stand;
        a linear actuator, wherein the linear actuators of the guide sets are symmetrically disposed around the base stand, and the linear actuators are arranged substantially parallel to each other; and a plurality of actuating rods, each of the plurality of actuating rods comprising:
an upper actuating rod having a first end at the upper side of the upper actuating rod, wherein the first end is connected to and driven by the linear actuator, and a stroke of the upper actuating rod is from beyond a bottom side of the base structure to beyond a top side of the base structure; and
a lower actuating rod pivotally connected to the upper actuating rod, wherein the lower actuating rod has a second end at the lower side of the lower actuating rod, wherein the second end is pivotally connected to and drives the movable platform.

4. The delta robot with delta mechanism of claim 3, wherein a shifting area of the upper actuating rod driven by the actuator is above the base structure.

5. The delta robot with delta mechanism of claim 3, wherein each of the lower actuating rods is connected to the movable platform and the upper actuating rod through a ball joint or a universal joint.

6. The delta robot with delta mechanism of claim 3, wherein each of the upper actuating rods is in bended shape.

7. A delta robot with a delta mechanism, the delta robot comprising:
a base platform, comprising:
a base structure; and
a base stand disposed at a center location of the base structure, wherein the base stand has an elongated shape extending from beyond a bottom side of the base structure to beyond a top side of the base structure;
a movable platform movable with respect to the base platform and configured to drive a carrier;
a rotating device connected to the base platform, and extending from the base platform and rotating the carrier through the movable platform; and
a plurality of guide sets connected between the base platform and the movable platform, each of the guide sets comprising:
an actuator, wherein the actuators of the guide sets are symmetrically disposed around the base stand; and
an actuating rod comprising:
an upper actuating rod having a first end, wherein the first end is connected to and drove by the actuator; and
a lower actuating rod pivotally connected to the upper actuating rod, wherein the lower actuating rod has a second end, wherein the second end is connected to and drives the movable platform.

8. The delta robot with delta mechanism of claim 7, wherein each of the upper actuating rods is in bended shape.

9. The delta robot with delta mechanism of claim 7, wherein each of the lower actuating rods is connected to the movable platform and the upper actuating rod through a ball joint or a universal joint.

10. The delta robot with delta mechanism of claim 3, wherein a shifting area of the upper actuating rod driven by the actuator and that of the lower actuating rod both include above and below the base structure.

11. The delta robot with delta mechanism of claim 3, wherein a shifting area of the upper actuating rod driven by the actuator and that of a portion of the lower actuating rod both include above the base structure.

12. The delta robot with delta mechanism of claim 3, wherein a shifting area of a portion of the upper actuating rod driven by the actuator and that of the lower actuating rod both include below the base structure.

* * * * *